(12) United States Patent
McNeil et al.

(10) Patent No.: US 11,803,369 B1
(45) Date of Patent: Oct. 31, 2023

(54) SYSTEMS AND METHODS PROVIDING CENTRALIZED COMMUNICATION ACROSS FEATURE PROGRAMMING WORKFLOWS

(71) Applicant: Citibank, N.A., New York, NY (US)

(72) Inventors: Laura McNeil, St Augustine, FL (US); Muthukumar Arunachalam, Chennai (IN); Srikanth Bezawada, Chennai (IN); Prag Sharma, Dublin (IE)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/345,417

(22) Filed: Jun. 30, 2023

(51) Int. Cl.
*G06F 8/70* (2018.01)

(52) U.S. Cl.
CPC ...................... *G06F 8/70* (2013.01)

(58) Field of Classification Search
CPC ............ G06F 8/433; G06F 8/70; G06N 5/022
See application file for complete search history.

(56) References Cited

U.S. PATENT DOCUMENTS

| | | | |
|---|---|---|---|
| 2017/0212928 A1* | 7/2017 | Abebe | G06F 16/24578 |
| 2020/0133711 A1* | 4/2020 | Webster | G06F 8/30 |
| 2023/0251854 A1* | 8/2023 | Jayapathi | G06F 8/71 |
| | | | 717/122 |

* cited by examiner

*Primary Examiner* — Hanh Thi-Minh Bui
(74) *Attorney, Agent, or Firm* — Perkins Coie LLP

(57) ABSTRACT

Systems and methods that provide centralized communication across feature programming workflows using software development lifecycle tools that dynamically determine temporal alerts are disclosed herein. By dynamically determining events that are temporally relevant, the system accounts for changes in an application timeline that comprises a plurality of events, in which each event of the plurality of events indicates when a respective feature of the plurality of features is available for use by the application, and in which the location of each event constantly changes.

17 Claims, 5 Drawing Sheets

US 11,803,369 B1

SYSTEMS AND METHODS PROVIDING CENTRALIZED COMMUNICATION ACROSS FEATURE PROGRAMMING WORKFLOWS

BACKGROUND

Software programming typically involves multiple streams of code and/or software programming teams interacting with each other to produce one or more applications, each of which may perform one or more features and/or functions. Accordingly, software programming is typically a team-based activity, in which the responsibilities for the features and source code necessary to produce a given feature (e.g., the plurality of features in a given application) are shared among team members. To facilitate this team activity, team members may submit contributions to the application using a software development lifecycle tool. This tool may include a codebase that features a full history of the project (e.g., that may mirror the codebase on every contributor's computer). The tool may also enable automatic management of different branches of the application (e.g., via providing configuration and document management, roadmaps for feature production, and/or centralized communication) as well as the merging of different contributions. The team may also utilize one or more software programming development and bug-tracking tools.

Furthermore, responsibilities of each team member are often intertwined. For example, in order to advance one feature, one user may need to wait for another user's submission (e.g., the completion of another feature), which may lead to bottlenecks. In cases of bottlenecks, software programming assignments are difficult to reassign and adding new users to assist in currently-in-progress contributions is difficult as the new users may need to be brought up to speed on the current progress. Moreover, software programming may involve individual stylistic choices that may not be common across the team, and for which variation from the stylistic choice may create issues with the contribution.

SUMMARY

Accordingly, systems and methods are described herein for novel uses and/or improvements to software development lifecycle tools. In particular, the systems and methods recite a software development lifecycle tool that minimizes the number of bottlenecks in software development by providing centralized communication across feature programming workflows. For example, due to the complexity of software development, software development for a given feature of a larger application is often siloed to users with a specific expertise in programming the relevant feature. However, because code for each feature is developed independently and/or may include timelines and/or events that are unknown to the developers of other features, detecting compliance to a development timeline for a feature to which a user is not involved is difficult. Nonetheless, given that a delay of a first feature may cause a second feature to be delayed (e.g., the second feature may have dependencies and/or may need to be conformed to the first feature), users need to coordinate to minimize bottlenecks.

One solution for overcoming this technical problem is for a software development lifecycle tool to send updates for all features to all development users. However, as the size and/or complexity of an application increases, the amount of content needed to be distributed may crowd out any content that is relevant to a given team and/or user. Furthermore, software development lifecycles are dynamic processes. As such, the deadline for a given event may constantly change as deadlines for other events and/or features may be delayed and/or finished ahead of schedule. Each of these updates may also crowd out the display and/or receipt of timely alerts, even if the alert is relevant to a given team and/or user.

In contrast to such a blunt solution, the systems and methods provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, the system may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, the systems and methods determine a current status of a software programming workflow (e.g., a workflow for one of the features of the application). The systems and methods may then estimate a likely time at which a feature is available for use by the application based on its current status (e.g., accounting for any delays and/or early production of a feature). The system may then select a threshold proximity for generating alerts (e.g., which may be specific to a given team or user). The system may then determine any events that are within the threshold proximity on the application timeline. Upon detecting any events, the systems and methods may generate an alert to users involved with features corresponding to the determined events. By doing so, the systems and methods may identify events (e.g., other features being available to an application) that are temporally relevant to a given feature being available for use by the application as well as filter those events based on the threshold proximity.

In some aspects, systems and methods are described herein for providing centralized communication across feature programming workflows using software development lifecycle tools that dynamically determine temporal alerts. For example, the system may determine a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application. The system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application. The system may determine a first location, in the application timeline, of the first event based on a current status of the software programming workflow. The system may retrieve a threshold proximity for generating alerts for a second feature programming workflow. The system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application. The system may generate for display, in a user interface of a software development lifecycle tool for the second feature, an alert based on the first location.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
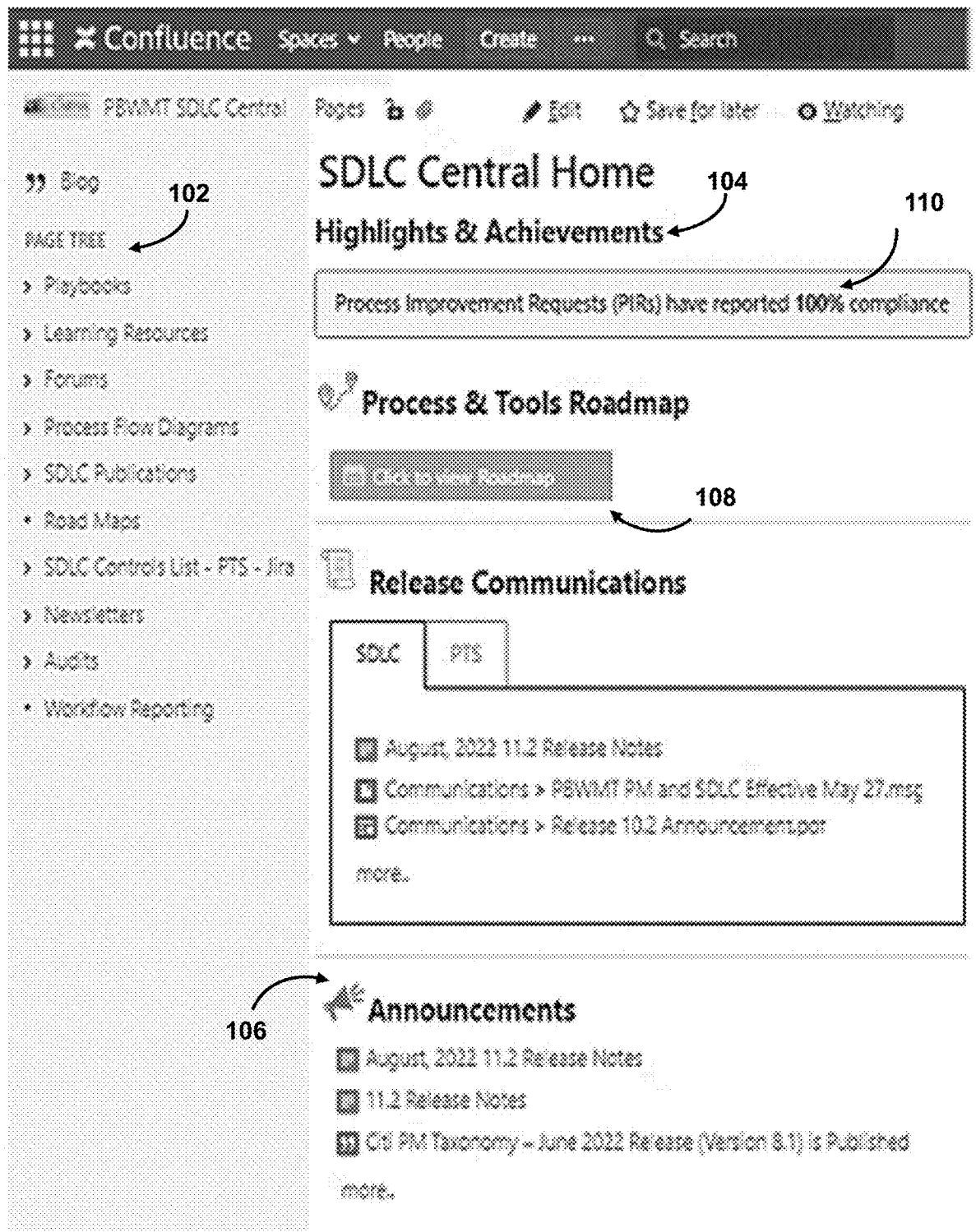
FIG. 1 shows an illustrative user interface for providing centralized communication across feature programming workflows, in accordance with one or more embodiments.

FIG. 1 shows an illustrative user interface for providing centralized communication across feature programming workflows, in accordance with one or more embodiments. For example, the system and methods described herein may generate for display, on a local display device, a user interface for a software development lifecycle tool. As referred to herein, a "user interface" may comprise a human-computer interaction and communication in a device and may include display screens, keyboards, a mouse, and the appearance of a desktop. For example, a user interface may comprise a way a user interacts with an application or a website. User interface 100 may comprise one or more alerts. For example, an alert may comprise any content.

As referred to herein, "content" should be understood to mean an electronically consumable user asset, such as internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user. In some embodiments, the content may comprise configuration and document management materials, roadmaps for feature production, and/or centralized communication alerts. For example, user interface 100 may represent a dashboard for a software development lifecycle tool to send code updates for all features to all development users.

User interface 100 may comprise a user interface for a software development lifecycle tool. In some embodiments, a software development lifecycle tool may include a software development lifecycle tool that integrates multiple other software development lifecycle tools. Through user interface 100, the software development lifecycle tool may receive a first user request to access a first code string alert (e.g., alert 104) and/or perform one or more operations, such as selecting code strings for feature programming workflows and/or applying parameters to the feature programming workflows (e.g., setting independent variables, uploading code strings, and/or selecting output settings). The system may output an alert that includes a plurality of information types, such as textual information, graphical information, and/or other information. In some embodiments, user interface 100 may comprise an easily understandable dashboard to provide a description of an alert.

Moreover, an alert may be specialized and/or communicated to a subset of users for which the alert is particularly relevant. For example, a deadline for a given event may constantly change as deadlines for other events and/or features may be delayed and/or finished ahead of schedule. Each of these updates may also crowd out the display and/or receipt of timely alerts, even if the alert is relevant to a given team and/or user. Additionally, each event (e.g., corresponding to progress of the software programming workflow) of the plurality of events indicates when a respective feature of the plurality of features is available for use by the application, and in which the location of each event constantly changes.

User interface 100 may provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, user interface 100 may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, user interface 100 may determine a current status of a software programming workflow (e.g., a workflow for one of the features of the application). User interface 100 may then estimate a likely time at which a feature is available for use by the application based on its current status (e.g., accounting for any delays and/or early production of a feature). User interface 100 may then select a threshold proximity for generating alerts (e.g., which may be specific to a given team or user). The system may then determine any events that are within the threshold proximity on the application timeline. Upon detecting any events, user interface 100 may generate an alert to users involved with features corresponding to the determined events. By doing so, user interface 100 may identify events (e.g., other features being available to an application) that are temporally relevant to a given feature being available for use by the application as well as filter those events based on the threshold proximity.

As referred to herein, a "code string" may comprise a program or sequence of instructions. In some embodiments, the code string may comprise a program or sequence of instructions that is interpreted or carried out by another program rather than by the computer processor (as a compiled program is). A code string may comprise one or more instructions and/or relate to one or more functions performed based on the instructions.

In some embodiments, the code string may comprise a code written in a particular language. As referred to herein, code may refer to the set of instructions or a system of rules written in a particular programming language (e.g., source code). In some embodiments, code may refer to source code after it has been processed by a compiler and made ready to run on the computer (e.g., the object code). As described herein, source code may be any collection of text, with or without comments, written using a human-readable programming language, usually as plain text. For example, the source code of a program is specially designed to facilitate the work of computer programmers who specify the actions to be performed by a computer mostly by writing source code. The source code may be transformed by an assembler or compiler (e.g., of the system) into binary machine code that can be executed by the computer. The machine code is then available for execution at a later time. For example, the machine code may be executed to perform one or more functions of an application feature and/or an application.

In some embodiments, user interface 100 may allow a user to select one or more code string attributes. Code string attributes may include any characteristic of a code string. These characteristics may comprise a type of data used, an algorithm used, data preparation and/or selection steps, and/or any other characteristic of one code string that distinguishes it from another. The system may also present information about the software development process, as shown in FIG. 1. For example, the system may present information (e.g., information 102) about users, roles, playbooks, learning resources, forums, and/or progress indicators for software development, as shown in user interface 100.

User interface 100 may allow for tracking and mitigating software programming workflow issues. For example, user interface 100 may provide a key functionality to filter the details of code string production based on the selection of a domain or a manager making the view specific for their tracking, enabling them to track in an efficient way, perform modifications to a code string, and/or run a feature test on a code string. For example, the system may allow a user to perform a feature test prior to performing a pull request for the application feature. A pull request is a mechanism for a developer to notify team members that they have completed a feature. Once their feature branch is ready, the developer files a pull request allowing other developers involved in the application development to know that an application feature is ready for review and merging into a main branch.

In some embodiments, the system may allow a user to designate, retrieve, and/or access a feature programming workflow. As referred to herein, a feature programming workflow may comprise supplemental data for performing a feature test. For example, a feature programming workflow may comprise rules for testing run-time test traffic for a designated, compartmentalized application feature. Additionally or alternatively, a feature programming workflow may comprise data for supplementing the first application feature to allow the first application to execute the first function. For example, the system may select a first feature programming workflow from a plurality of feature programming workflows, wherein each feature programming workflow of the plurality of feature programming workflows comprises data for supplementing the first application feature to allow the first application to execute the first function.

In some embodiments, a feature programming workflow may store features, scenarios, and feature descriptions to be tested. The feature programming workflow is an entry point to write the tests and is used as a live document at the time of testing. The tests of the feature programming workflow may comprise a scenario in a Given/When/Then format, which describes various characteristics for testing the feature. The file may provide a description of a feature test in a descriptive language (e.g., a human-readable text). The file may also comprise an automation test code string (e.g., data for supplementing a feature test such as variables to test or supplement in run-time data) as well. A feature programming workflow may contain a scenario or may contain many scenarios in a single feature programming workflow. Using the feature programming workflow, the system may correlate with all source systems, do complex calculations, and automatically generate the run-time traffic data upon which the native data and/or alert data may be generated.

For example, the system may store native data corresponding to fields of the software development lifecycle tool. The native data may include data-related run-time data generated by a first code string that executes a function for the application feature, wherein executing the function generates run-time function traffic. For example, the first code strings may comprise a series of steps that the software development lifecycle tool iterates through to test the security of any inputted code strings by running a function of the code strings (e.g., in a black box arrangement). The series of steps may include executing one or more dependencies (e.g., specific operations, functions, etc.) applied while testing an inputted code string. The first code strings may also have dependency branches. As the first code string iterates through its dependencies, it may determine to follow one dependency branch over another. For example, each dependency branch may correspond to a particular type of inputted code strings, a particular code string attribute of an inputted code string, data inputs of an inputted code string, etc. The dependency branches for the workflow may be comprehensive for any type of inputted code string that is detected. For example, the dependency branches may have branches devoted to every type of code string. Then, for each code string attribute, data input, etc., the system iterates along specific branches (or sub-branches) corresponding to each code string attribute, data input, etc., corresponding to an inputted code string. Through this structure, the software development lifecycle tool may receive different types of code strings and provide validations therefor. In some embodiments, the feature programming workflow may supplement the current data in the feature application (or code strings) by mimicking data and/or a dependency that is not yet available (e.g., due to the early stage of development) for the feature application.

The system may also comprise a feature programming workflow for the first application feature, wherein the feature programming workflow executes a feature test, wherein executing the feature test generates run-time feature test traffic. For example, the feature programming workflow may comprise a series of steps that the software development lifecycle tool iterates through to test the functionality of any inputted code strings by testing security credentials, APIs, certificates, etc. The series of steps may include one or more parameters, operations, functions, etc., to be applied while testing an inputted feature.

User interface 100 also includes native data for a plurality of c feature programming workflows. Native data or native data formats may comprise data that originates from and/or relates to a respective feature programming workflow, the software development lifecycle tool, and/or their respective plugins. In some embodiments, native data may include data resulting from native code, which is code written specifically for a given feature programming workflow, the software development lifecycle tool, and a respective plugin designed therefor. For example, as shown in user interface 100, the system may generate a graph, which may comprise native data. In some embodiments, native data for multiple feature programming workflow may be displayed simultaneously (e.g., in a side-by-side comparison).

For example, native data may comprise native data values or native data formats and may further comprise data that originates from and/or relates to a respective feature programming workflow, the software development lifecycle tools, and a respective plugin designed therefor. In some embodiments, native data may include data resulting from native code, which is code written specifically for the code development control system, the feature programming workflow, the software development lifecycle tools, and/or a respective plugin designed therefor. For example, the native data for the first code strings and the second feature programming workflow may comprise respective raw data inputs and/or data outputs and plot views. In some embodiments, the system may determine a first security characteristic of the first application feature using the first feature programming workflow. The system may determine a second security characteristic of the first application feature using the second feature programming workflow. The system may determine a difference in the first security characteristic and the second security characteristic. The system may then determine the alert data based on the difference.

For example, the system may generate a feature programming workflow (or benchmark test) based on the native code and/or dataset of one or more feature programming workflows. The feature programming workflows may describe a particular feature test for a particular feature application. The system may then compare the benchmark feature programming workflows to the one or more plurality of feature programming workflows. For example, the benchmark code strings may comprise a feature programming workflow generated by the system based on the native code and/or dataset of one or more code strings of the previously validated feature programming workflow. For example, the native code and/or dataset of one or more feature programming workflows may comprise the dataset upon which the other code strings were trained, tested, and/or compared. For example, the benchmark feature programming workflows may also share one or more feature programming workflow attributes with the one or more feature programming workflows of the previously validated code strings. However, the benchmark code strings may also include different feature programming workflow attributes. For example, the benchmark feature programming workflows may include a feature programming workflow attribute (e.g., a specific data preparation, algorithm, architecture, parameter value, etc.) that differs from the one or more feature programming workflows of the previously compared code strings. Based on these differences, the benchmark code strings may generate different results from the originally validated feature programming workflow. These differences may then be compared using alert data (e.g., alert data 106). For example, in some embodiments, alert data (e.g., alert data 106) may comprise quantitative or qualitative alerts of differences in data (e.g., compliance metric 110).

In some embodiments, native data may include a roadmap for a feature programming workflow (e.g., available via icon 108). For example, in some embodiments, the system may allow a user to update and/or edit the source code for an inputted feature programming workflow. For example, the system may receive a user modification to the source code for an inputted code string and then store the modification to the source code for an inputted feature programming workflow. The system may then generate for display the inputted code string (or native data for the inputted code strings) based on the modification to the source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 100 may also include other alert data. Alert data may be presented in any format and/or representation of data that can be naturally read by humans. In some embodiments, the alert data may appear as a graphical representation of data. For example, the alert data may comprise a graph of the first code string alert and/or a level of performance of a feature programming workflow. In such cases, generating the graph may comprise determining a plurality of code string alerts for different code strings and graphically representing a description of the plurality of code string alerts. In some embodiments, the description of the native data to the first code string alert may comprise a graphical display describing a hierarchal description of the first workflow of code string dependencies and the second workflow of code string dependencies. For example, the software development lifecycle tool may indicate differences and/or provide recommendations for adjustments to an inputted feature programming workflow. In some embodiments, alert data may comprise a quantitative or qualitative description of a likelihood that code string may be vulnerable to a vulnerability.

For example, the alert data may be presented in any format and/or representation of data that can be naturally read by humans (e.g., via a user interface such as user interface 100 (FIG. 1)). In some embodiments, the alert data may appear as a graphical representation of data. For example, the alert data may comprise a graph or chart of the first code string alert. In such cases, generating the graph may comprise determining a plurality of code strings for generating the first code string alert and graphically representing a description of the plurality of code strings (e.g., as shown in FIG. 1). In some embodiments, the description of the native data to the first code string alert may comprise a graphical display describing a description of a result of a feature test on a feature programming workflow.

In some embodiments, the alert data further comprises a recommendation for an adjustment to a feature programming workflow. The system may recommend one or more adjustments to a feature programming workflow in order to reduce risk in the code strings. For example, the system may generate a recommendation for an adjustment to the code strings data input or the second code strings attribute. For example, the system may generate a recommendation of an alternative technique (e.g., a different feature programming workflow attribute) for use in the second feature programming workflow. Additionally, or alternatively, the alert data may further comprise an effect of the description on the security characteristic of the first application feature using the second feature programming workflow. For example, the system may generate a feature programming workflow attribute that describes an effect of the current feature programming workflow.

Figure 2:
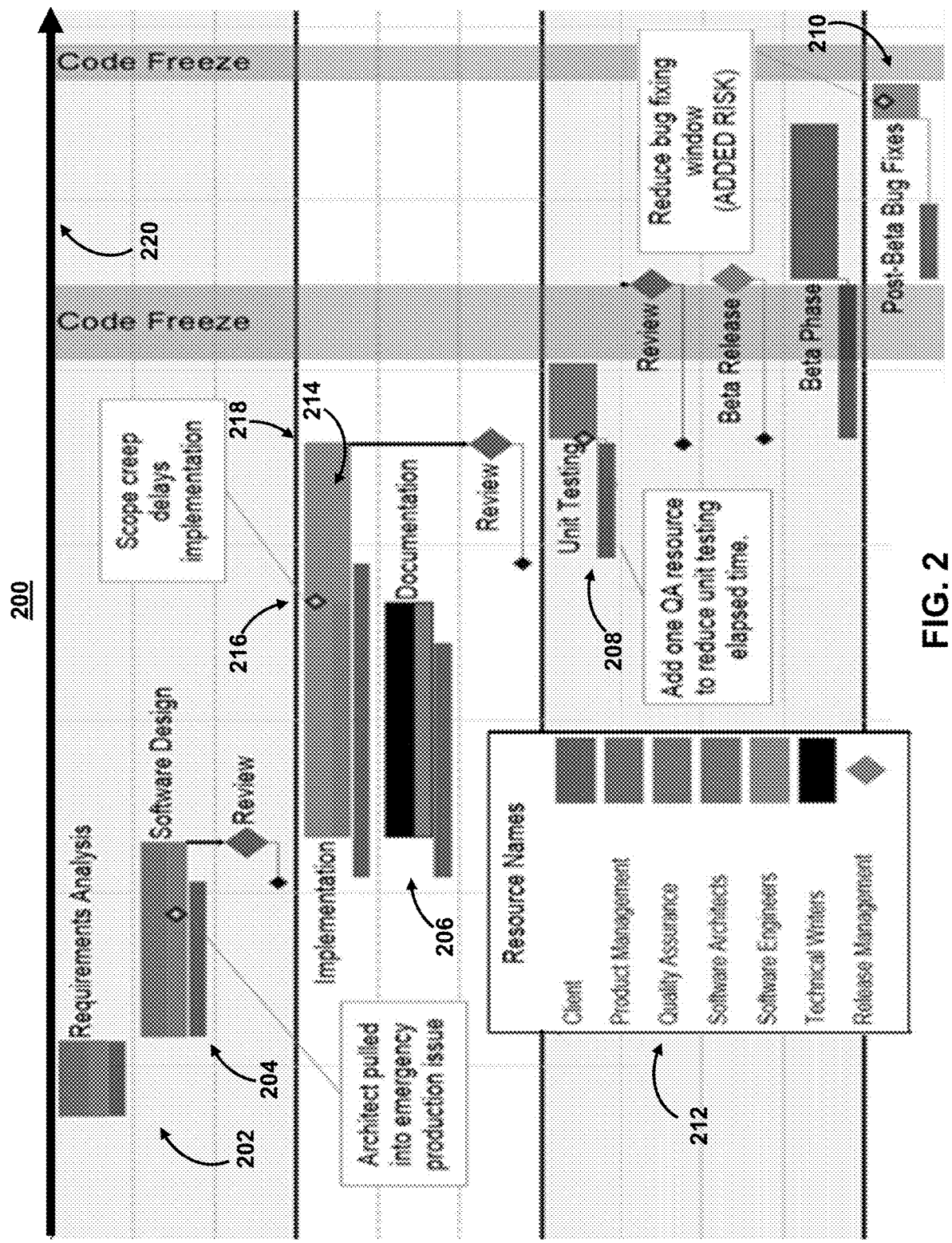
FIG. 2 shows an illustrative diagram for an event timeline, in accordance with one or more embodiments.

FIG. 2 shows an illustrative diagram for an event timeline, in accordance with one or more embodiments. For example, the system may determine a software programming workflow as represented by diagram 200. For example, the software programming workflow may correspond to production of an application. The production of the application itself may comprise numerous phases or parts such as the previously discussed beta phase as well as a planning phase, coding phase, building phase, testing phase (which may include the beta phase), deployment phase, operate phase, and/or monitor phase.

For example, during the planning phase, the development team collects input from stakeholders involved in the project such as customers, sales, internal and external experts, and developers. This input is synthesized into a detailed definition of the requirements for creating the desired software. The team also determines what resources are required to satisfy the project requirements, and then infers the associated cost. The coding phase includes system design in an integrated development environment. It also includes static code analysis and code review for multiple types of devices. The building phase takes the code requirements determined earlier and uses those to begin actually building the software. The testing phase entails the evaluation of the created software. The testing team evaluates the developed product(s) in order to assess whether they meet the requirements specified in the 'planning' phase. Assessments entail the performance of functional testing: unit testing, code quality testing, integration testing, system testing, security testing, performance testing and acceptance testing, as well as nonfunctional testing. If a defect is identified, developers are notified. Validated (actual) defects are resolved, and a new version of the software is produced. The release phase involves the team packaging, managing and deploying releases across different environments. In the deployment phase, the software is officially released into the production environment. The operate phase entails the use of the software in the production environment. In the monitor phase, various elements of the software are monitored. These could include the overall system performance, user experience, new security vulnerabilities, an analysis of bugs or errors in the system.

For example, computer programming is typically a team-based activity in which the responsibilities for the features and source code necessary to produce a given project (e.g., a software application) are shared among team members. In such cases, multiple streams of code and/or software programming teams interact with each other to produce one or more applications, each of which may perform one or more features and/or functions. To facilitate this team activity, team members may submit contributions to the project to a distributed version control system. This system may include a codebase that features a full history of the project that is mirrored on every contributor's computer. The system may enable automatic management of different branches of the project as well as the merging of different contributions. The team may also utilize one or more issue management and bug-tracking tools. The team may further out-source some issues to software-as-a-service providers. Accordingly, project management for computer programming often involves multiple team members and service providers sharing multiple versions as a single codebase for the project.

Diagram 200 may represent a software programming workflow as managed by a software development tool. The tool may include a codebase that features a full history of the project. In some embodiments, the system may mirror the codebase on every contributor's computer as well as enable automatic management of different branches of the application.

Diagram 200 illustrates a portion of the software programming workflow, which includes events corresponding to the beginning of the planning phase (e.g., event 202), coding phase (e.g., event 204), building phase (e.g., event 206), testing phase (e.g., event 208), and deployment phase (e.g., event 210). During each of these phases, numerous resources or users are each contributing to production of the application as shown in legend 212. The numerous resources may contribute to production by contributing to individual features of the production.

As described herein, a feature may comprise a portion of an application. For example, a feature may comprise a portion that distinguishes itself from other portions. For example, a feature may comprise the development of a function of an application, but a feature may also refer to a phase attributed to a function (e.g., the planning phase, coding phase, building phase, testing phase, deployment phase, operate phase, and/or monitor phase of the function) as well as a contribution to a function of a specific function.

The application may comprise a plurality of features and each feature may correspond to an event on the application timeline (e.g., timeline 220) represented by diagram 200. For example, the application timeline may comprise a plurality of events, wherein each event of the plurality of events indicates relevant points in time and/or time periods for a feature, application, and/or production. For example, an event may comprise a point in time when a phase for a feature, application, etc., is begun, ends, and/or when a respective feature of the plurality of features is available for use by the application.

Each feature may comprise its own feature programming workflow (e.g., workflow 214). The feature programming workflow may indicate one or more events specific to the production of the feature. For example, the system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application. As indicated by diagram 200, the locations at which different events of a feature programming workflow correspond to timeline 220 may change (e.g., as scope creep delays implementation). For example, an initial location (e.g., point 216) on timeline 220 at which a first feature that was supposed to be available for use by the application has been dynamically adjusted to reflect a delay (e.g., adjusted to point 218).

For example, the system may determine a first location, in the application timeline, of the first event based on a current status of the software programming workflow. For example, the system may receive data from one or more sources that indicate a status of a feature and/or feature programming workflow. In some embodiments, this may comprise a system (e.g., manually or automatically) updating a completion date in a log for the feature. For example, the system may determine a number of events corresponding to the plurality of features that are in compliance with an initial application timeline for software programming workflow and determine the current status based on the number of events.

In some embodiments, the system may determine a likely or predicted completion date based on a current status of other events, features, applications, etc. For example, the system may determine an outcome of a previous phase and monitor all phases to run sequentially. The system may provide a tangible output (e.g., a specific date) for the end of each phase, feature programming workflow, etc. The system may also monitor ongoing release cycles, each featuring small, incremental changes from a previous release cycle. At each iteration, the system may update other events.

In some embodiments, the system may dynamically determine when a given feature will be available based on whether production timelines corresponding to one or more other features are met. For example, the system may continually and/or on a predetermined schedule determine whether or not the current status of a given feature is in compliance. For example, the system may determine a current date. The system may determine a predicted status of one of the plurality of features at the current date. The system may determine an actual status of the one of the plurality of features at the current date. The system may compare the predicted status to the actual status to determine the current status.

In some embodiments, the system may dynamically determine when a given feature will be available based on whether production timelines corresponding to one or more other features are met. For example, the system may continually and/or on a predetermined schedule determine whether one or more timelines for one or more features is in compliance. For example, the system may determine a number of events corresponding to the plurality of features that are in compliance with an initial application timeline for software programming workflow. The system may determine the current status based on the number of events.

In some embodiments, the system may dynamically determine when a given feature will be available based on whether production timelines corresponding to one or more other features are met. For example, the system may determine a frequency at which events are in compliance with an initial application timeline for software programming workflow. For example, the system may determine a frequency at which events corresponding to the plurality of features are in compliance with an initial application timeline for software programming workflow. The system may determine the current status based on the frequency.

In some embodiments, the system may dynamically determine when a given feature will be available based on whether production timelines corresponding to one or more other features are met. For example, the system may determine an average delay at which features previously made available to the application were made available to the application. The system may determine an average delay for previous events on the application timeline. The system may determine the current status based on the average delay.

For example, the system may determine various events for one or more features in order to generate alerts. The alerts may be issued to a subset of users (e.g., users corresponding to a given resource, feature, application, etc.). For example, the system may provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, the system may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, the system may determine a current status of a software programming workflow (e.g., a workflow for one of the features of the application). The system may then estimate a likely time at which a feature is available for use by the application based on its current status (e.g., accounting for any delays and/or early production of a feature). The system may then select a threshold proximity for generating alerts (e.g., which may be specific to a given team or user). The system may then determine any events that are within the threshold proximity on the application timeline. Upon detecting any events, the system may generate an alert to users involved with features corresponding to the determined events. By doing so, the system may identify events (e.g., other features being available to an application) that are temporally relevant to a given feature being available for use by the application as well as filter those events based on the threshold proximity.

The system may retrieve a threshold proximity for generating alerts for a second feature programming workflow. The system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application. The system may generate for display, in a user interface of a software development lifecycle tool for the second feature, an alert based on the first location.

In some embodiments, the threshold proximity may be different for each feature application workflow. For example, the system may select a threshold proximity based on a lead time required by a given feature application workflow for changes to its timeline. For example, the lead time may depend on a current status (or stage in development) for the feature programming workflow. In some embodiments, the threshold proximity may be different for each feature application workflow and/or based on the status of other feature application workflows. For example, the system may select a threshold proximity based on whether another feature application is delayed or will be released ahead of schedule (e.g., non-compliance with a current timeline). For example, sudden changes in scheduling may increase the urgency at which a feature may need to be completed and/or may introduce additional delays into the development cycle. As such, the system may modify the length of the threshold proximity to capture events resulting from non-compliance with a current timeline. In some embodiments, the system may determine which feature programming workflows (or users corresponding to the feature programming workflows) for which alerts should be generated. For example, the system may determine different workflows that correspond to the same users. The system may then generate alerts to those users.

Figure 3A:
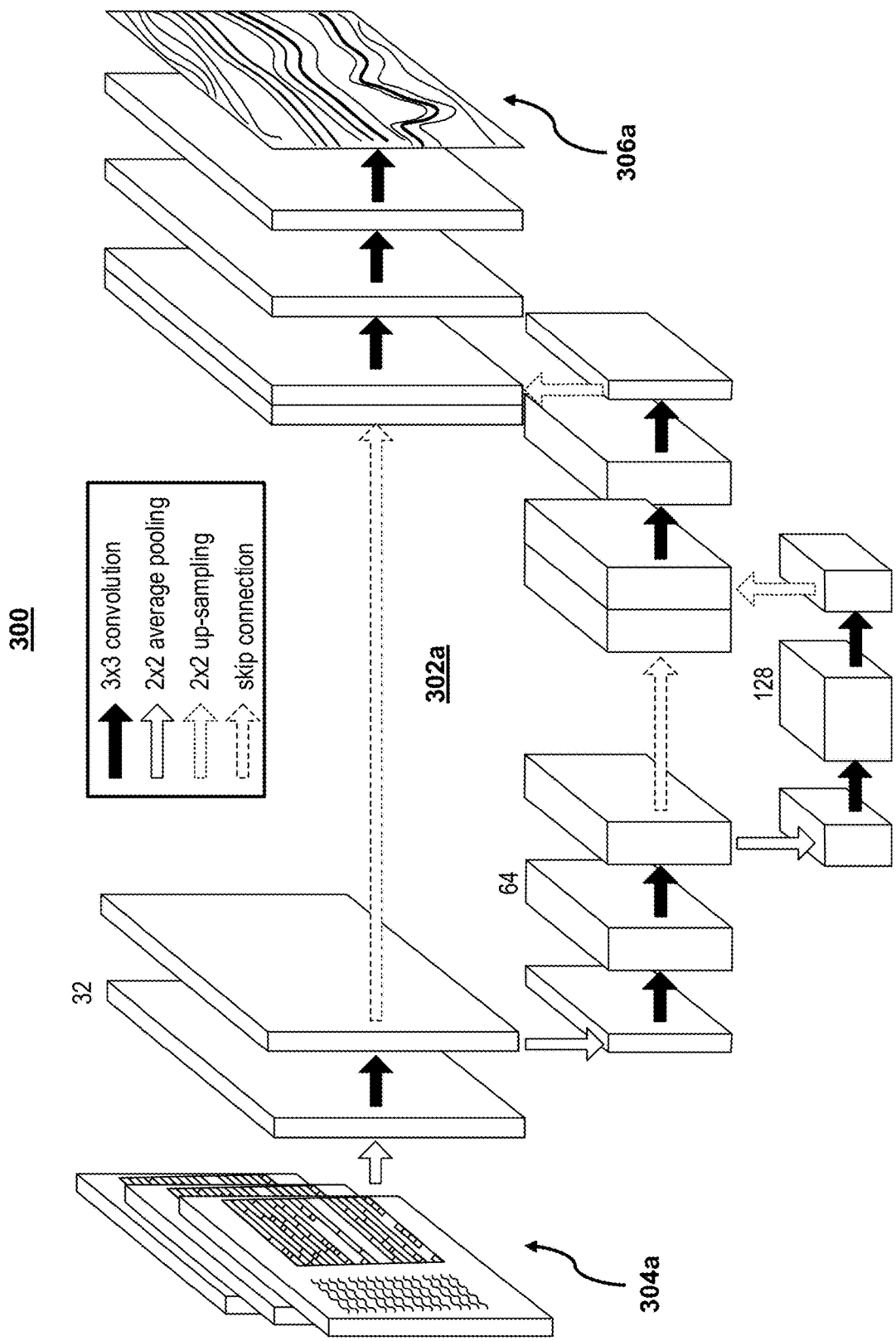
FIGS. 3A-B show illustrative components for a system used to provide centralized communication across feature programming workflows, in accordance with one or more embodiments.

FIG. 3A shows illustrative components for a system used to provide centralized communication across feature programming workflows using software development lifecycle tools that dynamically determine temporal alerts in accordance with one or more embodiments. For example, FIG. 3A may show illustrative components for a software development lifecycle tool as used by system 300.

System 300 also includes model 302a, which may be a machine learning model, artificial intelligence model, etc., (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a current status of a software programming workflow, a location of an event, etc.).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions. In some embodiments, the model (e.g., model 302a) may automatically perform actions based on outputs 306a. In some embodiments, the model (e.g., model 302a) may not perform any actions.

Figure 3B:
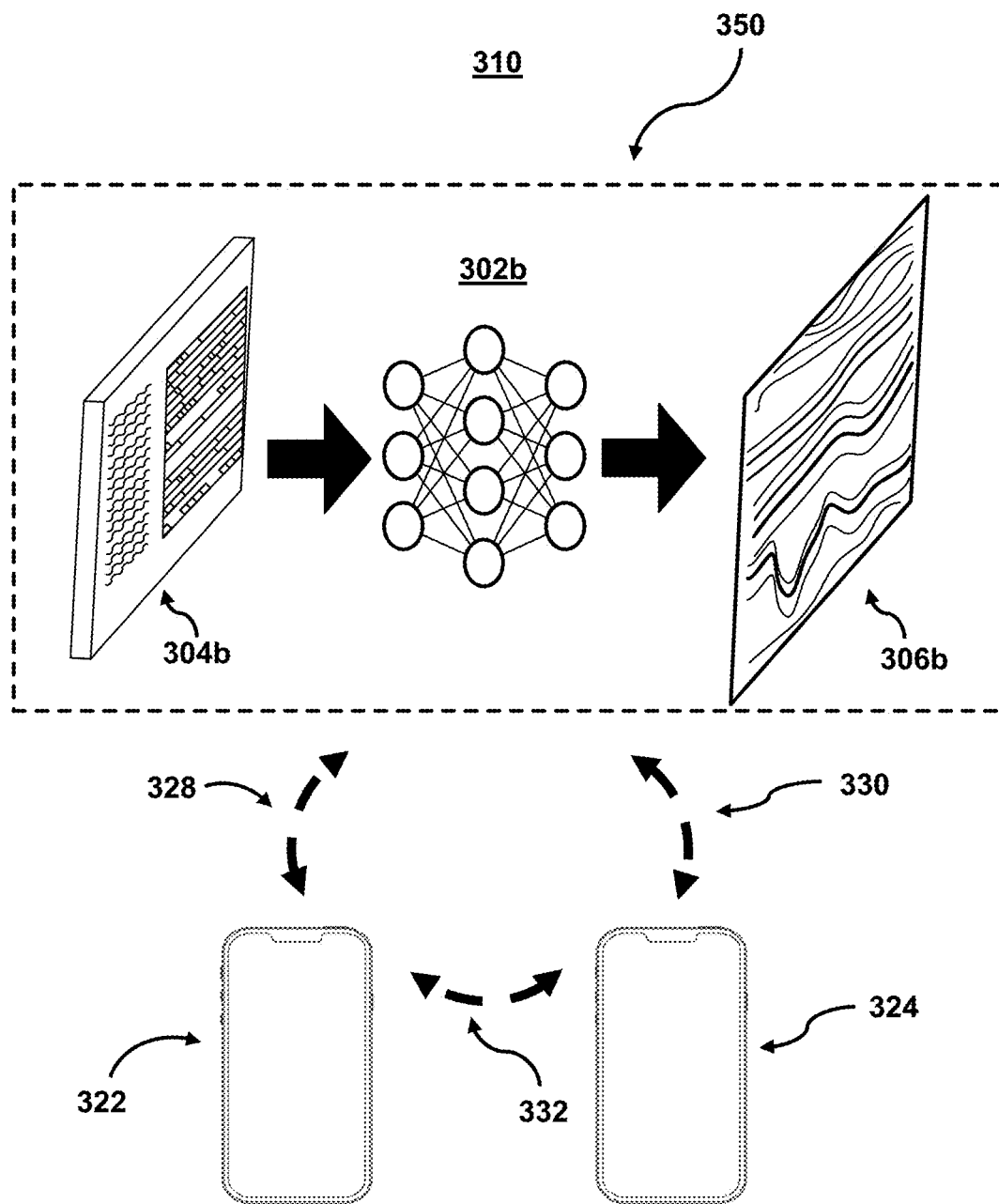

As shown in FIG. 3B, system 310 may include mobile device 322 and mobile device 324. While shown as a smartphone, respectively, in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that, while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 310.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a current status of a software programming workflow, a location of an event, etc.).

Model 302b is shown as a convolutional neural network. A convolutional neural network consists of an input layer (e.g., input 304b, hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
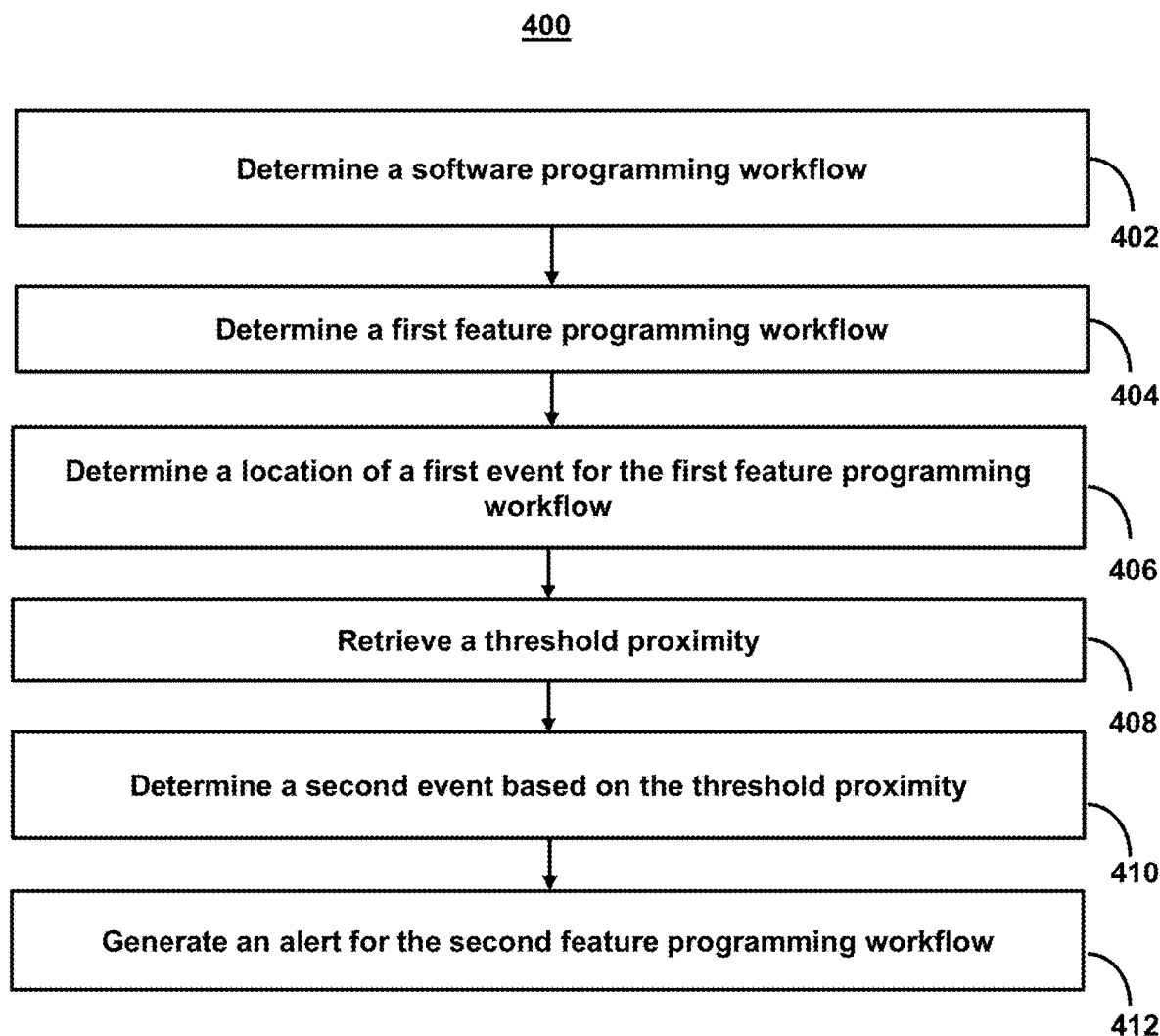
FIG. 4 shows a flowchart of the steps involved in providing centralized communication across feature programming workflows, in accordance with one or more embodiments.

FIG. 4 shows a flowchart of the steps involved in providing centralized communication across feature programming workflows, in accordance with one or more embodiments. For example, the system may use process 400 (e.g., as implemented on one or more system components described above) in order to provide centralized communication across feature programming workflows using software development lifecycle tools that dynamically determine temporal alerts.

At step 402, process 400 (e.g., using one or more components described above) determines a software programming workflow. For example, the system may determine a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application.

At step 404, process 400 (e.g., using one or more components described above) determines a first feature programming workflow. For example, the system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application.

At step 406, process 400 (e.g., using one or more components described above) determines a location of a first event for the first feature programming workflow. For example, the system may determine a first location, in the application timeline, of the first event based on a current status of the software programming workflow. In some embodiments, the system may determine the current status using an artificial intelligence model. For example, the system may receive an output of an artificial intelligence model, wherein the artificial intelligence model has been trained on historic compliance data for historic event data. The system may determine the current status based on the output.

In some embodiments, the system may dynamically determine when a given feature will be available based on whether production timelines corresponding to one or more other features are met. For example, the system may continually and/or on a predetermined schedule determine whether or not the current status of a given feature is in compliance. For example, determining the first location, in the application timeline, of the first event based on the current status of the software programming workflow may comprise the system determining a current date, determining a predicted status of one of the plurality of features at the current date, determining an actual status of the one of the plurality of features at the current date, and comparing the predicted status to the actual status to determine the current status.

In some embodiments, the system may dynamically determine when a given feature will be available based on whether production timelines corresponding to one or more other features are met. For example, the system may continually and/or on a predetermined schedule determine whether one or more timelines for one or more features is in compliance. For example, determining the first location, in the application timeline, of the first event based on the current status of the software programming workflow may comprise the system determining a number of events corresponding to the plurality of features that are in compliance with an initial application timeline for software programming workflow and determining the current status based on the number of events.

In some embodiments, the system may dynamically determine when a given feature will be available based on whether production timelines corresponding to one or more other features are met. For example, the system may determine a frequency at which events are in compliance with an initial application timeline for software programming workflow. For example, determining the first location, in the application timeline, of the first event based on the current status of the software programming workflow may comprise the system determining a frequency at which events corresponding to the plurality of features are in compliance with an initial application timeline for software programming workflow and determining the current status based on the frequency.

In some embodiments, the system may dynamically determine when a given feature will be available based on whether production timelines corresponding to one or more other features are met. For example, the system may determine an average delay at which features previously made available to the application were made available to the application. For example, determining the first location, in the application timeline, of the first event based on the current status of the software programming workflow may comprise the system determining an average delay for previous events on the application timeline and determining the current status based on the average delay.

In some embodiments, the system may determine the location of an event using an artificial intelligence model. For example, the system may receive an output of an artificial intelligence model, wherein the artificial intelligence model has been trained on historic compliance data for historic event data. The system may determine the first location based on the output.

At step 408, process 400 (e.g., using one or more components described above) retrieves a threshold proximity. For example, the system may retrieve a threshold proximity for generating alerts for a second feature programming workflow.

In some embodiments, the threshold proximity may be different for each feature application workflow. For example, the system may select a threshold proximity based on a lead time required by a given feature application workflow for changes to its timeline. For example, the lead time may depend on a current status (or stage in development) for the feature programming workflow. For example, retrieving the threshold proximity for generating alerts for a second feature programming workflow may comprise the system determining a current status of the second feature programming workflow and determining the threshold proximity based on the current status of the second feature programming workflow.

In some embodiments, the threshold proximity may be different for each feature application workflow and/or based on the status of other feature application workflows. For example, the system may select a threshold proximity based on whether another feature application is delayed or will be released ahead of schedule (e.g., non-compliance with a current timeline). For example, sudden changes in scheduling may increase the urgency at which a feature may need to be completed and/or may introduce additional delays into the development cycle. As such, the system may modify the length of the threshold proximity to capture events resulting from non-compliance with a current timeline. For example, retrieving the threshold proximity for generating alerts for a second feature programming workflow may comprise the system determining an initial location of the first event in an initial application timeline for software programming workflow, determining a difference in the initial location and the first location, and determining the threshold proximity based on the difference.

In some embodiments, the system may determine which feature programming workflows (or users corresponding to the feature programming workflows) for which alerts should be generated. For example, the system may determine different workflows that correspond to the same users. The system may then generate alerts to those users. For example, retrieving the threshold proximity for generating alerts for the second feature programming workflow may comprise the system determining a first user corresponding to both the first feature programming workflow and the second feature programming workflow and determining to retrieve the threshold proximity based on the first user corresponding to both the first feature programming workflow and the second feature programming workflow.

In some embodiments, the system may determine which feature programming workflows (or users corresponding to the feature programming workflows) for which alerts should be generated. For example, the system may determine to only generate alerts for feature programming workflows that are related and/or otherwise contextually relevant. To determine whether two feature programming workflows are related, the system may determine whether a number of dependencies (e.g., shared data input/outputs, shared functions, dependent functions, etc.) exist. For example, the system may determine a number of dependencies between the first feature programming workflow and the second feature programming workflow. The system may compare the number of dependencies to a threshold number of dependencies to determine whether to retrieve the threshold proximity.

In some embodiments, the system may determine a threshold proximity based on the user input. For example, the system may receive a user input. The system may then determine the threshold proximity based on the user input. In some embodiments, the system may retrieve a plurality of threshold proximities for one or more features. For example, the system may retrieve an additional threshold proximity for generating alerts for a third feature programming workflow. The system may determine a third event of the plurality of events that is within the additional threshold proximity on the application timeline, wherein the third feature programming workflow corresponds to production of a third feature of the plurality of features, wherein the third feature programming workflow comprises a third timeline that ends at the third event of the plurality of events on the application timeline, and wherein the third event indicates that the third feature is available for use by the application. The system may generate for display, in the user interface of the software development lifecycle tool for the second feature, an additional alert based on the first location.

At step 410, process 400 (e.g., using one or more components described above) determines a second event based on the threshold proximity. For example, the system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application.

At step 412, process 400 (e.g., using one or more components described above) generates an alert for the second feature programming workflow. For example, the system may generate for display, in a user interface of a software development lifecycle tool for the second feature, an alert based on the first location.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing centralized communication across feature programming workflows using software development lifecycle tools that dynamically determine temporal alerts.
2. The method of any one of the preceding embodiments, further comprising: determining a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application; determining a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application; determining a first location, in the application timeline, of the first event based on a current status of the software programming workflow; retrieving a threshold proximity for generating alerts for a second feature programming workflow; determining a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application; and generating for display, in a user interface of a software development lifecycle tool for the second feature, an alert based on the first location.
3. The method of any one of the preceding embodiments, wherein retrieving the threshold proximity for generating alerts for a second feature programming workflow further comprises: determining a current status of the second feature programming workflow; and determining the threshold proximity based on the current status of the second feature programming workflow.

4. The method of any one of the preceding embodiments, wherein retrieving the threshold proximity for generating alerts for a second feature programming workflow further comprises: determining an initial location of the first event in an initial application timeline for software programming workflow; determining a difference in the initial location and the first location; and determining the threshold proximity based on the difference.
5. The method of any one of the preceding embodiments, wherein retrieving the threshold proximity for generating alerts for the second feature programming workflow further comprises: determining a first user corresponding to both the first feature programming workflow and the second feature programming workflow; and determining to retrieve the threshold proximity based on the first user corresponding to both the first feature programming workflow and the second feature programming workflow.
6. The method of any one of the preceding embodiments, wherein determining the first location, in the application timeline, of the first event based on the current status of the software programming workflow further comprises: determining a current date; determining a predicted status of one of the plurality of features at the current date; determining an actual status of the one of the plurality of features at the current date; and comparing the predicted status to the actual status to determine the current status.
7. The method of any one of the preceding embodiments, wherein determining the first location, in the application timeline, of the first event based on the current status of the software programming workflow further comprises: determining a number of events corresponding to the plurality of features that are in compliance with an initial application timeline for software programming workflow; and determining the current status based on the number of events.
8. The method of any one of the preceding embodiments, wherein determining the first location, in the application timeline, of the first event based on the current status of the software programming workflow further comprises: determining a frequency at which events corresponding to the plurality of features are in compliance with an initial application timeline for software programming workflow; and determining the current status based on the frequency.
9. The method of any one of the preceding embodiments, wherein determining the first location, in the application timeline, of the first event based on the current status of the software programming workflow further comprises: determining an average delay for previous events on the application timeline; and determining the current status based on the average delay.
10. The method of any one of the preceding embodiments, further comprising: determining a number of dependencies between the first feature programming workflow and the second feature programming workflow; and comparing the number of dependencies to a threshold number of dependencies to determine whether to retrieve the threshold proximity.
11. The method of any one of the preceding embodiments, further comprising: receiving a user input; and determining the threshold proximity based on the user input.
12. The method of any one of the preceding embodiments, further comprising: retrieving an additional threshold proximity for generating alerts for a third feature programming workflow; determining a third event of the plurality of events that is within the additional threshold proximity on the application timeline, wherein the third feature programming workflow corresponds to production of a third feature of the plurality of features, wherein the third feature programming workflow comprises a third timeline that ends at the third event of the plurality of events on the application timeline, and wherein the third event indicates that the third feature is available for use by the application; and generating for display, in the user interface of the software development lifecycle tool for the second feature, an additional alert based on the first location.
13. The method of any one of the preceding embodiments, further comprising: receiving an output of an artificial intelligence model, wherein the artificial intelligence model has been trained on historic compliance data for historic event data; and determining the first location based on the output.
14. The method of any one of the preceding embodiments, further comprising: receiving an output of an artificial intelligence model, wherein the artificial intelligence model has been trained on historic compliance data for historic event data; and determining the current status based on the output.
15. A tangible, non-transitory, machine-readable medium storing instructions that, when executed by a data processing apparatus, cause the data processing apparatus to perform operations comprising those of any of embodiments 1-15.
16. A system comprising one or more processors; and memory storing instructions that, when executed by the processors, cause the processors to effectuate operations comprising those of any of embodiments 1-15.
17. A system comprising means for performing any of embodiments 1-15.

What is claimed is:

1. A system for providing centralized communication across feature programming workflows using software development lifecycle tools that dynamically determine temporal alerts, the system comprising:
   one or more processors; and
   a non-transitory, computer readable medium comprising instructions that when executed by the one or more processors cause operations comprising:
      determining a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application;
      determining a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application;
      receiving a first output from one or more artificial intelligence models based on the software programming workflow and the first feature programming workflow, wherein the one or more artificial intelligence models have been trained on historic compliance data for historic event data;

determining a current status of the software programming workflow based on the first output;

determining a first location, in the application timeline, of the first event based on the current status of the software programming workflow, wherein the current status is further based on a second output of the one or more artificial intelligence models;

determining a number of dependencies between the first feature programming workflow and a second feature programming workflow; and comparing the number of dependencies to a threshold number of dependencies;

in response to the number of dependencies exceeding the threshold number of dependencies, retrieving a threshold proximity for generating alerts for the second feature programming workflow;

determining a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application; and generating for display, in a user interface of a software development lifecycle tool for the second feature, an alert based on the first location.

2. A method for providing centralized communication across feature programming workflows using software development lifecycle tools that dynamically determine temporal alerts, the method comprising:

determining a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application;

determining a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application;

receiving a first output from one or more artificial intelligence models based on the software programming workflow and the first feature programming workflow, wherein the one or more artificial intelligence models have been trained on historic compliance data for historic event data;

determining a current status of the software programming workflow based on the first output;

determining a first location, in the application timeline, of the first event based on the current status of the software programming workflow, wherein the current status is further based on a second output of the one or more artificial intelligence models;

determining a number of dependencies between the first feature programming workflow and a second feature programming workflow; and comparing the number of dependencies to a threshold number of dependencies;

in response to the number of dependencies exceeding the threshold number of dependencies, retrieving a threshold proximity for generating alerts for a second feature programming workflow;

determining a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application; and generating for display, in a user interface of a software development lifecycle tool for the second feature, an alert based on the first location.

3. The method of claim 2, wherein retrieving the threshold proximity for generating alerts for a second feature programming workflow further comprises:

determining a current status of the second feature programming workflow; and determining the threshold proximity based on the current status of the second feature programming workflow.

4. The method of claim 2, wherein retrieving the threshold proximity for generating alerts for a second feature programming workflow further comprises:

determining an initial location of the first event in an initial application timeline for software programming workflow;

determining a difference in the initial location and the first location; and determining the threshold proximity based on the difference.

5. The method of claim 2, wherein retrieving the threshold proximity for generating alerts for the second feature programming workflow further comprises:

determining a first user corresponding to both the first feature programming workflow and the second feature programming workflow; and determining to retrieve the threshold proximity based on the first user corresponding to both the first feature programming workflow and the second feature programming workflow.

6. The method of claim 2, wherein determining the first location, in the application timeline, of the first event based on the current status of the software programming workflow further comprises:

determining a current date;

determining a predicted status of one of the plurality of features at the current date;

determining an actual status of the one of the plurality of features at the current date; and comparing the predicted status to the actual status to determine the current status.

7. The method of claim 2, wherein determining the first location, in the application timeline, of the first event based on the current status of the software programming workflow further comprises:

determining a number of events corresponding to the plurality of features that are in compliance with an initial application timeline for software programming workflow; and determining the current status based on the number of events.

8. The method of claim 2, wherein determining the first location, in the application timeline, of the first event based on the current status of the software programming workflow further comprises:
  determining a frequency at which events corresponding to the plurality of features are in compliance with an initial application timeline for software programming workflow; and
  determining the current status based on the frequency.

9. The method of claim 2, wherein determining the first location, in the application timeline, of the first event based on the current status of the software programming workflow further comprises:
  determining an average delay for previous events on the application timeline; and
  determining the current status based on the average delay.

10. The method of claim 2, further comprising:
  receiving a user input; and
  determining the threshold proximity based on the user input.

11. The method of claim 2, further comprising:
  retrieving an additional threshold proximity for generating alerts for a third feature programming workflow;
  determining a third event of the plurality of events that is within the additional threshold proximity on the application timeline, wherein the third feature programming workflow corresponds to production of a third feature of the plurality of features, wherein the third feature programming workflow comprises a third timeline that ends at the third event of the plurality of events on the application timeline, and wherein the third event indicates that the third feature is available for use by the application; and
  generating for display, in the user interface of the software development lifecycle tool for the second feature, an additional alert based on the first location.

12. A non-transitory, computer readable medium comprising instructions that when executed by one or more processors cause operations comprising:
  determining a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application;
  determining a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application;
  receiving a first output from one or more artificial intelligence models based on the software programming workflow and the first feature programming workflow, wherein the one or more artificial intelligence models have been trained on historic compliance data for historic event data;
  determining a current status of the software programming workflow based on the first output;
  determining a first location, in the application timeline, of the first event based on the current status of the software programming workflow, wherein the current status is further based on a second output of the one or more artificial intelligence models;
  determining a number of dependencies between the first feature programming workflow and a second feature programming workflow; and
  comparing the number of dependencies to a threshold number of dependencies;
  in response to the number of dependencies exceeding the threshold number of dependencies, retrieving a threshold proximity for generating alerts for a second feature programming workflow;
  determining a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application; and
  generating for display, in a user interface of a software development lifecycle tool for the second feature, an alert based on the first location.

13. The non-transitory, computer readable medium of claim 12, wherein retrieving the threshold proximity for generating alerts for a second feature programming workflow further comprises:
  determining a current status of the second feature programming workflow; and
  determining the threshold proximity based on the current status of the second feature programming workflow.

14. The non-transitory, computer readable medium of claim 12, wherein retrieving the threshold proximity for generating alerts for a second feature programming workflow further comprises:
  determining an initial location of the first event in an initial application timeline for software programming workflow;
  determining a difference in the initial location and the first location; and
  determining the threshold proximity based on the difference.

15. The non-transitory, computer readable medium of claim 12, wherein retrieving the threshold proximity for generating alerts for the second feature programming workflow further comprises:
  determining a first user corresponding to both the first feature programming workflow and the second feature programming workflow; and
  determining to retrieve the threshold proximity based on the first user corresponding to both the first feature programming workflow and the second feature programming workflow.

16. The non-transitory, computer readable medium of claim 12, wherein determining the first location, in the application timeline, of the first event based on the current status of the software programming workflow further comprises:
  determining a current date;
  determining a predicted status of one of the plurality of features at the current date;
  determining an actual status of the one of the plurality of features at the current date; and
  comparing the predicted status to the actual status to determine the current status.

17. The non-transitory, computer readable medium of claim 12, wherein determining the first location, in the application timeline, of the first event based on the current status of the software programming workflow further comprises:
   determining a number of events corresponding to the plurality of features that are in compliance with an initial application timeline for software programming workflow; and
   determining the current status based on the number of events.

\* \* \* \* \*